Patented Sept. 16, 1924.

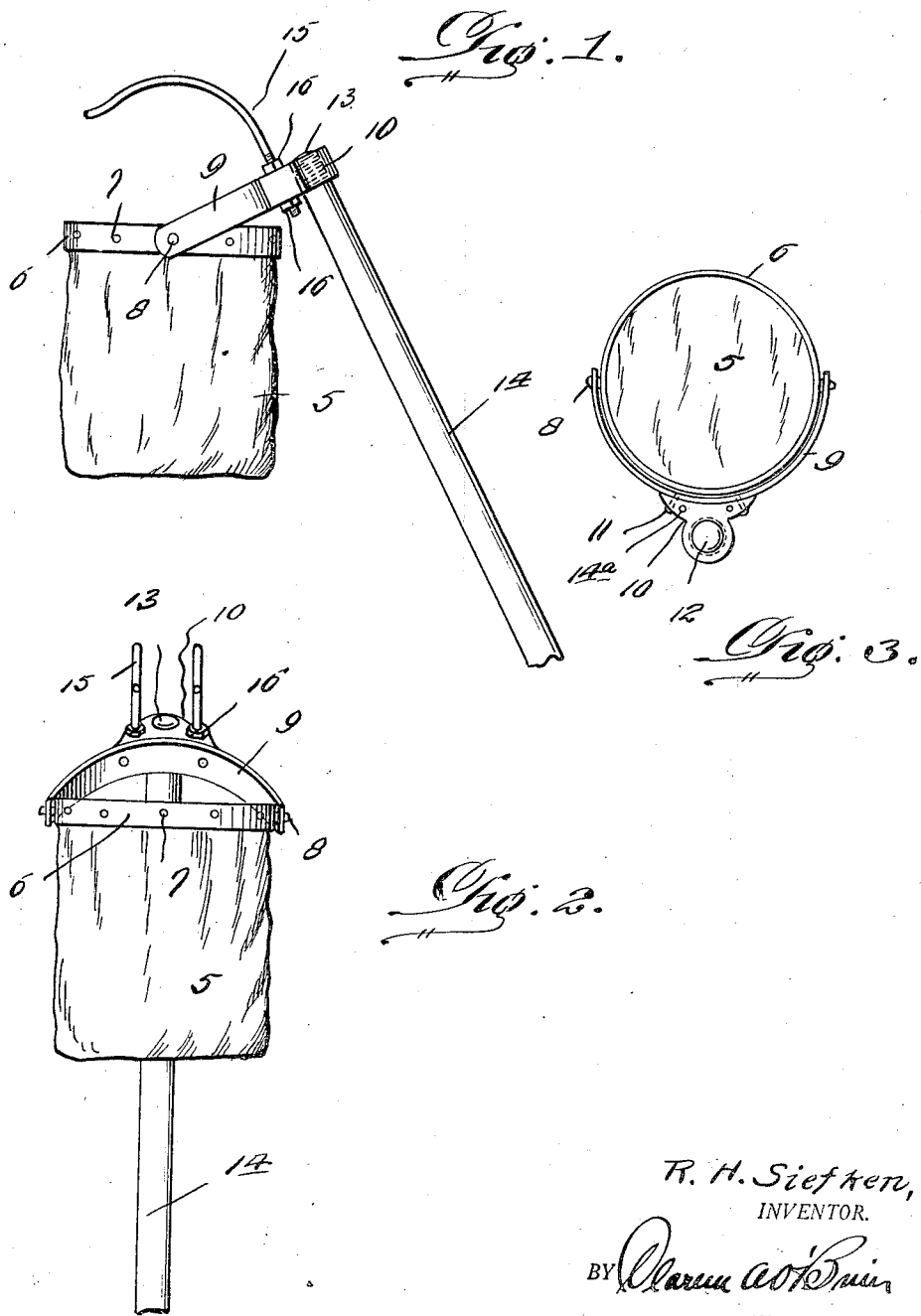

1,508,728

UNITED STATES PATENT OFFICE.

RENKO H. SIEFKEN, OF MARSHALLTOWN, IOWA.

FRUIT GATHERER.

Application filed February 4, 1924. Serial No. 690,563.

*To all whom it may concern:*

Be it known that I, RENKO H. SIEFKEN, a citizen of the United States, residing at Marshalltown, in the county of Marshall and State of Iowa, have invented certain new and useful Improvements in Fruit Gatherers, of which the following is a specification.

This invention relates to fruit gatherers, of that type embodying a receptacle supported by a relatively long handle or pole equipped with fingers for detaching the fruit from a tree and causing the same to fall into the receptacle, such devices being adapted for facilitating picking of fruit from trees when the fruit is inaccessible to a person standing on the ground.

The primary object of the invention is to provide a device of the above kind which is extremely simple and durable in construction and efficient in operation.

Another object of the invention is to provide a fruit gatherer of the above kind with fruit detaching fingers which may be adjusted relative to each other for adapting the device in gathering fruit of different kinds and sizes.

Another object of the invention is to provide a device which may be readily manufactured and assembled as well as easily manipulated without special skill.

Other objects will appear as the nature of the invention is better understood, and the same consists in the novel form, combination, and arrangement of parts hereinafter more fully described, shown in the accompanying drawing and claimed.

In the drawing, wherein like reference characters indicate corresponding parts throughout the several views:

Figure 1 is a side elevational view of a fruit gatherer constructed in accordance with the present invention with the handle thereof broken away.

Figure 2 is a front elevational view of the device shown in Figure 1, and

Figure 3 is a top plan view with parts removed.

Referring more in detail to the drawing, the present invention consists of a relatively small fruit receptacle consisting of a bag 5 that is held in open condition by means of a ring 6 to which the upper edge portion of the bag 5 is attached by riveting or the like, as at 7. The ring 6 is provided with outwardly projecting pivot pins 8, at diametrically opposite points, and these pins loosely project into openings provided in the free ends of a substantially semi-circular bail 9, that is preferably formed of a strip of sheet metal and has a bracket 10 secured upon the outer side thereof intermediate the ends of the same through the medium of rivets 11 or the like. By reason of the connection between the bag ring 6 and the bail 9, the bag 5 will assume a proper vertical position at all times, even though the bail 9 be disposed at an inclination as shown in Figures 1 and 2.

The bracket 10 is provided at its outer end with a transverse threaded opening as at 12 for detachable connection of the threaded upper end 13 of a relatively long straight handle or pole 14, the lower end of which is adapted to be grasped in the hand of the operator. In this manner the handle is rigidly attached to the bail 9.

The bracket 10 is further provided with a pair of spaced transverse openings 14$^a$ in which are loosely rotatably disposed the lower ends of fruit detaching fingers 15, said lower ends of the fingers 15 being threaded and having nuts 16 threaded thereon at opposite sides of the brackets 10. The fingers 15 are thus mounted in side by side relation and by reason of their hook like form, they project upwardly and forwardly from the bail 9 above the ring 6 and the bag 5 supported thereby.

By loosening the nuts 16, the fingers 15 may be adjusted by moving their free ends toward or away from each other so that such fingers may properly engage the fruit for detaching the same upon a downward pull upon the handle 14. When this adjustment has been made, the nuts 16 are tightened so as to maintain this adjustment and prevent accidental relative displacement of the fingers 15 or displacement of the same relative to the bracket 10.

In use, the handle 14 is raised so as to engage the fingers 15 over the fruit at opposite sides of the stem of the fruit, and then a downward pull is exerted upon the handle 14 so as to cause the fingers 15 to detach the fruit from the tree. As soon as the fruit is detached, it will fall from between the fingers 15 into the bag 5 and when the latter has become filled with fruit, the device is lowered for permitting depositing of the fruit into a larger collection receptacle or the like.

From the foregoing description, it is believed that the construction and operation, as well as the advantages of the present invention will be readily understood and appreciated by those skilled in the art.

What I claim as new is:

In a fruit gatherer, a bail, a bracket integral with the intermediate portion of said bail, said bracket being provided with means to permit a handle to be connected thereto, and also provided with a pair of openings, a pair of longitudinally curved fruit engaging and pulling fingers having threaded portions on one end thereof, the free ends of said fingers extending outwardly beyond the pivoted ends of said bail, the threaded ends of said fingers being passed through said openings, and retaining nuts fitted on said threaded portions of said fingers and bearing against opposite faces of said brackets for maintaining the fingers in a set position.

In testimony whereof I affix my signature.

RENKO H. SIEFKEN.